United States Patent [19]
Choi et al.

[11] Patent Number: 5,796,965
[45] Date of Patent: Aug. 18, 1998

[54] INTELLIGENT POWER CIRCUIT FOR EXTERNAL DATA DRIVE

[75] Inventors: Hwangsoo Choi, Cupertino; Manpo Kwong, San Jose; Seong S. Shin, Cupertino, all of Calif.

[73] Assignee: Texas Instruments Incorporated, Dallas, Tex.

[21] Appl. No.: 663,754

[22] Filed: Jun. 14, 1996

[51] Int. Cl.$^6$ ............................. G06F 13/00; G06F 1/18
[52] U.S. Cl. .................... 395/309; 395/281; 395/750.01; 395/822
[58] Field of Search ........................... 395/281, 284, 395/309, 822, 833, 750.01

[56] References Cited

U.S. PATENT DOCUMENTS 5,128,664  7/1992  Bishop ........................ 340/825.07
5,557,739  9/1996  Gupta et al. ...................... 395/183.1
5,619,659  4/1997  Kikinis et al. ...................... 395/281

*Primary Examiner*—Jack B. Harvey
*Assistant Examiner*—Jeffrey K. Seto
*Attorney, Agent, or Firm*—Ronald O. Neerings; James C. Kesterson; Richard L. Donaldson

[57] ABSTRACT

A notebook computer (10) includes provides power to a parallel port floppy drive (24) through the parallel port connector (48). The computer (10) includes a power switching circuit (30) which detects whether a printer or floppy drive is connected to the parallel port connector (48). If a floppy drive (24) is connected, the power is enabled through the parallel port connector (48). If a printer is connected, power is disabled through the parallel port connector (48).

32 Claims, 3 Drawing Sheets

INTELLIGENT POWER CIRCUIT FOR EXTERNAL DATA DRIVE

BACKGROUND OF THE INVENTION

1. Technical Field

This invention relates in general to computers and, more particularly, to a computer having an intelligent power circuit for an external data drive.

2. Description of the Related Art

For many years, the popularity of portable computers has risen as the size and weight of the portable computer has been reduced. Early portable computers were known as "luggable" computers, since they could be transported, but were only slightly smaller and lighter than comparable desktop computers. "Laptop" computers were smaller and lighter, but generally had reduced features and flexibility because most of the circuitry needed to be designed into the laptop motherboard without the option of expansion boards.

"Notebook" computers are significantly smaller and lighter than laptop computers. These computers can be carried easily in a briefcase. Unlike desktop computers, notebook computers generally do not provide any internal bus slots for peripheral devices other than extra memory. Many common peripherals, such as a hard drive, serial and parallel ports, and often a modem, are built into the system board(s) of the notebook computer. Other peripherals, such as network interfaces and faster modems, are available to the user through one or more peripheral slots which are externally available. While some proprietary slots have been used in the past, most notebooks offering peripheral slots now use either one or more PCMCIA (also known as PC Card) slots or, the successor to PCMCIA, CardBus slots (referred to collectively herein as "peripheral slots").

Floppy drives present a particular problem. In general, the floppy drive is used mainly for loading programs, transferring data for use on another computer, and archiving small amounts of data. Since the floppy drive is not used often, a floppy drive having an interface to the computer's parallel port can be used. Similarly, other data drives, such as CD-ROM drives or tape drives, use the parallel port to connect to a computer.

One drawback of data drives which interface through the parallel port involves powering the drive. The parallel port does not supply power to the connected device, other than low voltage levels containing the data signals. Accordingly, data drives which interface through the parallel port contain a dedicated power supply, typically using an AC/DC converter which is connected to the data drive through a separate port. The use of a separate power supply reduces the portability and convenience of the external data drive. If external power is necessary, the data drive is inoperable in many situations where an AC power source is unavailable or inconveniently located.

Other designs provide a proprietary floppy port which supplies both data signals and power; this design adds the cost and weight of another connector and requires a proprietary interface for the floppy drive.

Therefore, a need has arisen in the industry for a computer system with a standard connector through which an external data drive can receive power.

SUMMARY OF THE INVENTION

The present invention provides a computer system which includes processing circuitry and an input/output port coupled to the processing circuitry. The input/output port includes a plurality of input/output pins for transmitting signals. Data drive detection circuitry detects a connection of a data drive to the input/output port and power switching circuitry selectively applies power to at least one of the pins to power a detected data drive.

The present invention provides significant advantages over the prior art. First, the computer's parallel port can power the data drive directly, without additional power sources or separate ports. Second, the design requires only minimal modifications to existing parallel port data drives. Existing computer designs can be easily adapted to supply power to the data drive through the parallel port.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The present invention is best understood in relation to FIGS. 1-5 of the drawings, like numerals being used for like elements of the various drawings.

Figure 1:
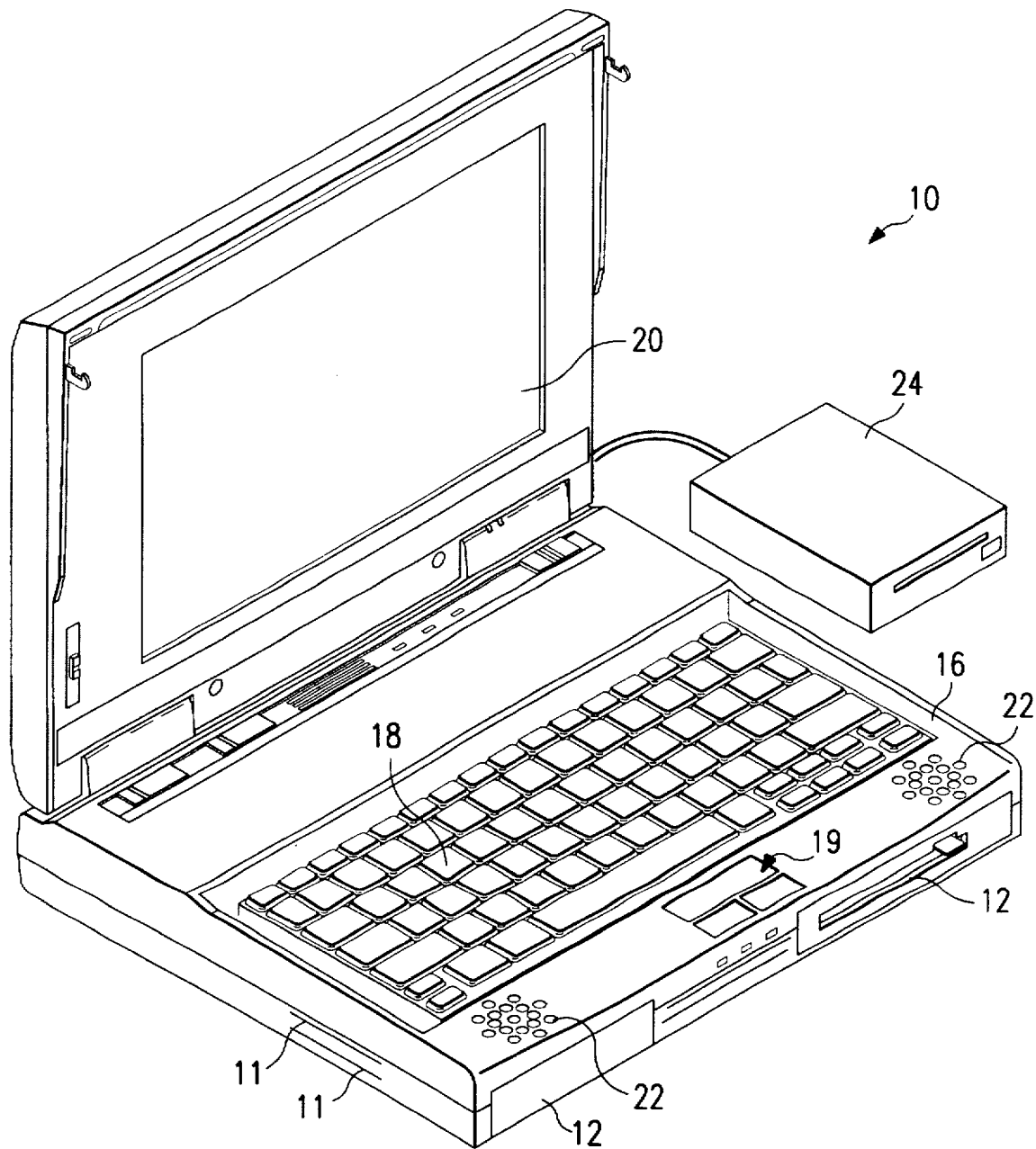
FIG. 1 illustrates a perspective view of a computer coupled to an external data drive.

FIG. 1 illustrates a perspective view of a notebook computer system 10 having two peripheral assemblies 11 for receiving two peripheral devices, such as PCMCIA or CardBus modems, network interfaces, hard drives or sound cards. Modular bays 12 can be used for larger devices such as floppy drives, hard disk drives, CD-ROMs, magneto-optical (MO) drives, batteries, or cellular telecommunication devices. The computer system 10 includes a main housing 16, within which the computer electronics are housed. The peripheral assemblies 11 are accessible through the housing. A keyboard 18 is placed at the top of the main housing 16. Keyboard 18, in the preferred embodiment, includes a pointing device, such as touch pad 19. A display 20 is attached to the main housing 16. Typically, the display 20 is connected to the main housing 16 by a hinge, such that the display 20 can be folded away from the main housing 16 when the computer 10 is in use and folded flush with the main housing 16 for portability when the computer 10 is inactive. For a multimedia computer, speakers 22 are shown as provided in main housing 16.

A floppy drive 24 is connected to the parallel port (not shown) of the computer 10. Floppy drive 24 is of a type that can receive and send data through the parallel port of a computer; such drives are typical in the notebook computer field. Rather than use a separate power source, the floppy drive 24 receives its power through the parallel port from the notebook computer's battery. While the present invention is discussed in connection with a parallel port floppy drive, other types of data drives, such as parallel port CD-ROMs, high density removable disk drives and parallel port tape drives could be adapted to receive power through the parallel port using the circuit shown in FIGS. 3–5.

While FIG. 1 illustrates a specific notebook computer design, it should be noted that many modifications could be made. For example, many different pointing devices could be used, such as a mouse, a trackball or an integrated joystick. Other features, such as speakers and modular bays are optional and not needed to practice the present invention, as would be known to one skilled in the art.

Figure 2:
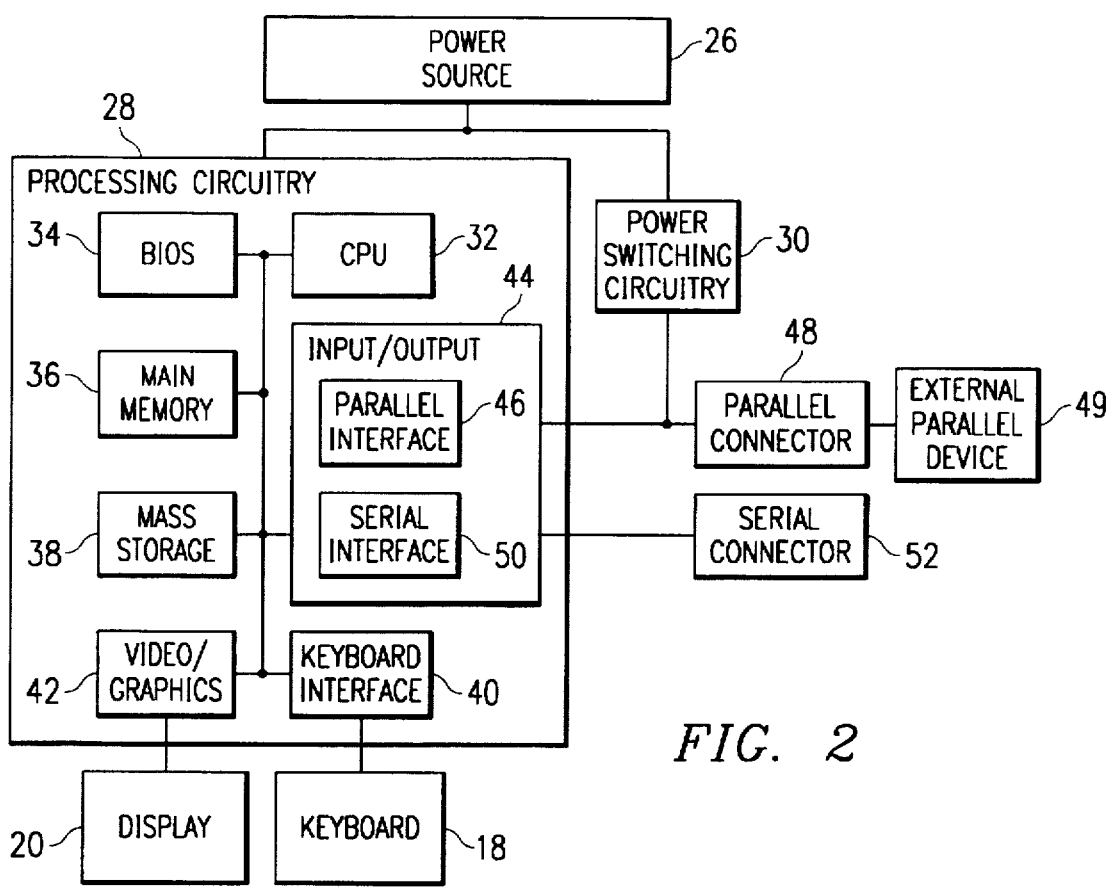
FIG. 2 illustrates a block diagram of the computer of FIG. 1.

FIG. 2 illustrates a basic block diagram of the computer 10, for an IBM PC-compatible architecture. Power source 26 (i.e., the battery or AC/DC converter for a portable computer) is coupled to processing circuitry 28, display 20, keyboard 18 and power switching circuitry 30. Processing circuitry 28 includes, CPU (central processing unit) 32, BIOS (basic input output system) 34, main memory 36, mass storage 38, keyboard interface 40, video circuitry 42 (including a frame buffer) and input/output circuitry 44. The overall design of processing circuitry 28 is conventional and, as would be known to a person skilled in the art, the specifics of the design of the processing circuitry can vary. The parallel port interface 46 of input/output circuitry 44 is connected to parallel port connector 48, which provides a physical connection to an external device 49. Similarly, the serial port interface 50 of input/output circuitry 44 is connected to serial port connector 52, which provides a physical connection to an external serial device. Power switching circuitry 30 is coupled to the parallel port connector 48 and power source 26.

In operation, the parallel port may be coupled to (1) a printer or other device which does not receive power through the parallel port or to (2) a floppy drive or other data drive which can receive power through the parallel port. In response to which device, if any, is connected to the parallel port, the power switching circuitry 30 either (1) disables power through the parallel port connector 48 or (2) enables power to be supplied through one or more of the parallel port pins of the parallel port connector 48.

Figure 3:
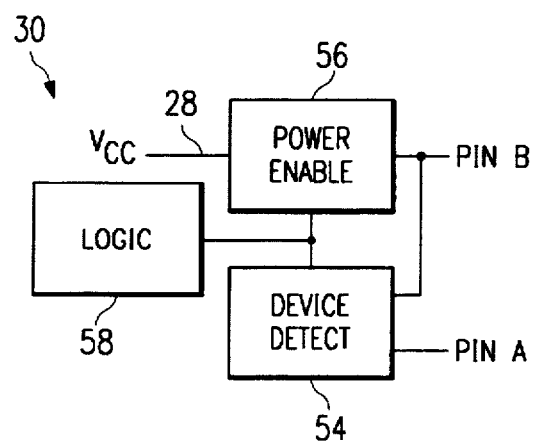
FIG. 3 illustrates a block diagram of the power switching circuitry of FIG. 2.

A block diagram of the power switching circuitry 30 is shown in FIG. 3. Device detect circuitry 54 is coupled to Pin A and Pin B of the parallel port connector 48. The output of device detect circuitry 54 is coupled to power enable circuitry 56 and to logic 58. Power enable circuitry 56 is coupled to the power source, $V_{cc}$ and to Pin B.

In operation, the device detect circuitry detects whether a printer or floppy (or neither) is coupled to the parallel port, responsive to the connections to the external device 49 on Pin A and Pin B. Power enable circuitry 56 passes power to Pin B if a floppy (or other similarly configured data drive) is coupled to the parallel port connector 48. If a printer is connected to the parallel port connector 48, the power enable circuitry disables power to Pin B.

In the preferred embodiment, Pin A is Pin "20" on the parallel interface and Pin B is Pin "24" on the parallel interface. When no external device 29 is plugged into the parallel port connector 48, both Pin A and Pin B will be floating. When a printer is plugged into the parallel port connector 48, both Pin A and Pin B will be coupled to ground by the printer. For the illustrated embodiment, a parallel port floppy drive connected to the parallel port connector 48 grounds Pin A and couples the floppy drive's power rail with Pin B, as described in further detail herein.

While pins "20" and "24" of the parallel port connector are used in conjunction with the power switching circuitry in the illustrated embodiment, other pins could be used to identify the device coupled to the parallel port connector 48.

The logic 58 also detects the connection of a floppy drive to the parallel port connector 48. In the preferred embodiment, logic 58 generates an SMI (system management interrupt) whenever a floppy drive is connected or disconnected from the parallel port 48. This allows the system operating system to re-enumerate its configuration information to account for the current hardware configuration. The SMI handler routine is typically set in the system BIOS.

Figure 4:
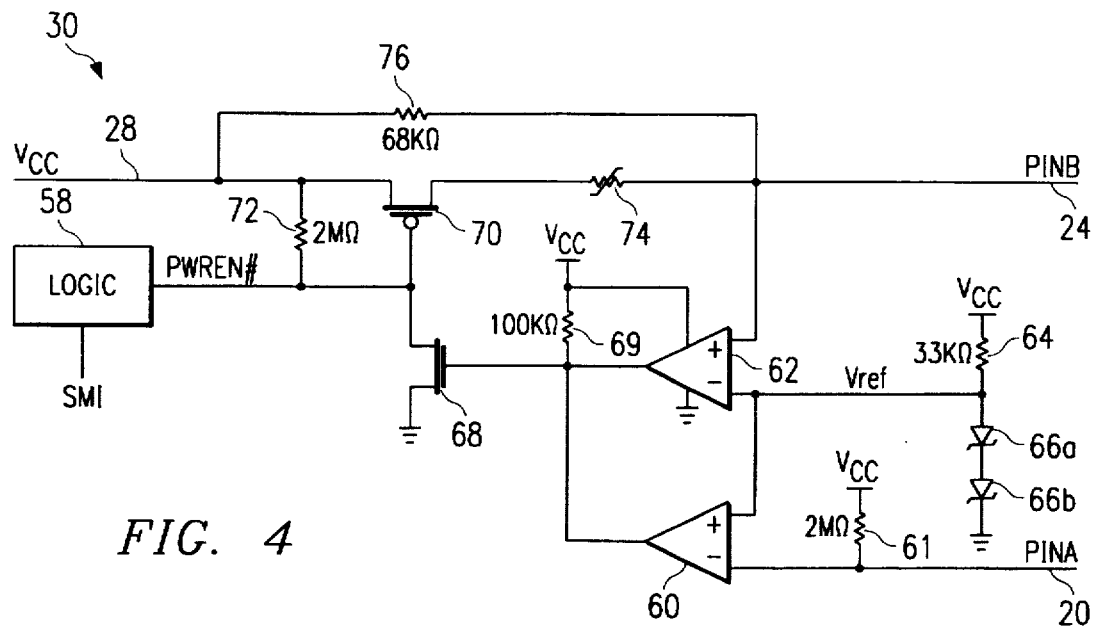
FIG. 4 illustrates a schematic representation of a first embodiment of a circuit for powering the external data drive through an input/output port.

FIG. 4 illustrates a schematic representation of a first embodiment for power switching circuitry 30 with exemplary resistor values. Pin A is coupled to the inverting input of operational amplifier (hereinafter "op-amp") 60. Pin A is also coupled to $V_{cc}$ through pull-up resistor 61 (2 MΩ). The non-inverting input of op-amp 60 is coupled to the inverting input of op-amp 62 and to a voltage reference, Vref. Vref is produced at a node coupled to $V_{cc}$ through a pull-up resistor 64 (33 KΩ) and coupled to ground through Schottky diodes 66a and 66b. Hence, Vref is approximately 0.6–0.7 volts. The outputs of op-amps 60 and 62 are coupled to the gate of n-channel transistor 68, along with pull-up resistor 69 (100 KΩ), which is coupled between the gate of n-channel transistor 68 and $V_{cc}$. The source of n-channel transistor 68 is coupled to ground and the drain of n-channel transistor 68 is coupled to the gate of p-channel transistor 70. The gate of p-channel transistor 70 is also coupled to the source of p-channel transistor 70 through resistor 72 (2 MΩ) and to logic 58. The signal at the gate of p-channel transistor 70 is shown as the PWREN# signal.

The source of p-channel transistor 70 is also coupled to the power source ($V_{cc}$) 28. The drain of p-channel transistor 70 is coupled to the first terminal of a thermal protected resistor (TPR) 74. The second terminal of TPR 74 is coupled to Pin B. Resistor 76 (68 KΩ) has a first terminal coupled to power source 28 and a second terminal coupled to Pin B. Pin B is also connected to the non-inverting input of op-amp 62.

The operation of the circuit of FIG. 4 will be discussed in connection with three possible states: (1) no external device 29 is coupled to the parallel port connector 48, (2) a floppy drive is coupled to the parallel port connector 48 and (3) a printer is coupled to the parallel port connector 48.

In the first case, where no external device 29 is coupled to the parallel port connector 48, Pin A of parallel port connector 48 will be pulled to $V_{cc}$ through pull-up resistor 61. Accordingly, the inverting input will have voltage ($V_{cc}$) higher than the non-inverting input voltage (Vref) and op-amp 60 will hold its output at zero volts. Consequently, the gate of n-channel transistor 68 will be held at zero volts, thereby turning transistor 68 off. With n-channel transistor 68 turned off, the gate of p-channel transistor 70 will be pulled to $V_{cc}$ through pull-up resistor 72. Thus, p-channel transistor 72 will be turned off, decoupling the power source 28 from Pin B except through resistor 76, which has a high resistance level, on the order of 68K ohms. Since Pin B is floating, however, no current will pass through resistor 76.

In the second case, where a floppy drive, or other appropriately configured data drive, is coupled to the parallel port connector 48, Pin A of parallel port connector 48 will be pulled to ground on the floppy drive, overcoming the voltage through the pull-up resistor 61. Accordingly, the inverting input will have a voltage lower than the non-inverting input, and op-amp 60 will be in open drain mode, where it no longer prevents n-channel transistor 68 from turning on. Pin B is coupled to the power rail of the floppy drive, which has input equivalent resistance ($R_{if}$) and capacitance ($C_{if}$). Current through resistor 76 will charge $C_{if}$ such that the voltage at the non-inverting input of op-amp 62 is greater than Vref. Accordingly, op-amp 62 will also be in open drain mode and the gate of n-channel transistor will be pulled to $V_{cc}$ through pull-up resistor 69.

With transistor 68 enabled, the gate of p-channel transistor 70 is pulled to ground, which allows $V_{cc}$ to pass through the source and drain of transistor 70 to Pin B to power the floppy drive. TPR 74 acts as a fuse to stop current flow if excessive heat is generated.

In the third case, where a printer is connected to parallel port connector 48, both Pin A and Pin B will be connected to ground (by convention). Thus, while Pin A will set op-amp 60 to an open drain output, Pin B will remain at zero volts (since the current through resistor 76 will not be able to charge the grounded Pin B). Accordingly, n-channel transistor 68 will be turned off, causing p-channel transistor 70 to be turned off as its gate is pulled to $V_{cc}$ through resistor 72. With transistor 72 turned off, Pin B will be decoupled from the power source 28, except through resistor 76 which has a high resistance level, allowing only a small amount of current (approximately 0.07 milliamps) to pass to Pin B.

Figure 5:
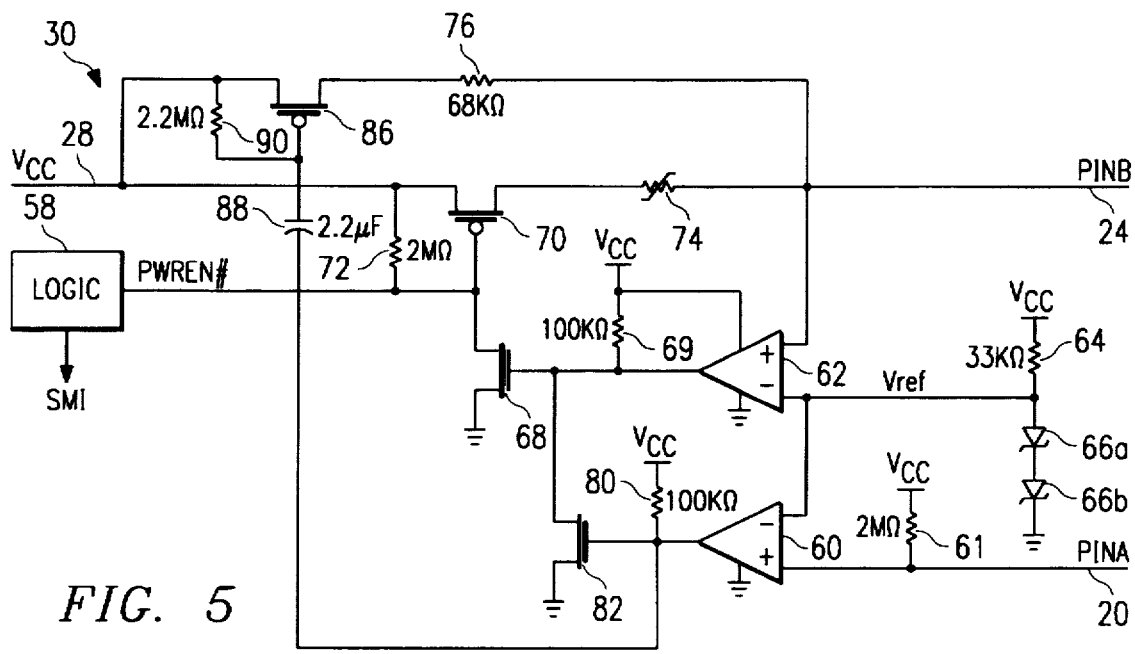
FIG. 5 illustrates a schematic representation of a second embodiment of a circuit for powering the external data drive through an input/output port.

Although the amount of current passing through resistor 76 to the printer is small, it may be desirable to eliminate this current to increase the battery life of a notebook computer. FIG. 5 illustrates a circuit which performs the same power switching function as the circuit of FIG. 4, while reducing power drain while the parallel port 48 is connected to a printer.

For illustration purposes, many of the reference numerals of FIG. 4 have been incorporated into FIG. 5. Pin A is coupled to the non-inverting input of op-amp 60 (note that in FIG. 4, Pin A is connected to the inverting input of op-amp 60). Pin A is also coupled to $V_{cc}$ through pull-up resistor 61. The inverting input of op-amp 60 is coupled to the inverting input of op-amp 62 and to the voltage reference, Vref, which is produced at a node coupled to $V_{cc}$ through a pull-up resistor 64 and coupled to ground through Schottky diodes 66a and 66b. Hence, Vref is approximately 0.6-0.7 volts. The output of op-amp 60 is coupled to $V_{cc}$ through pull-up resistor 80 (100 KΩ) and to the gate of an n-channel transistor 82. N-channel transistor 82 has a source connected to ground and a drain coupled to the gate of n-channel transistor 68, along with the output of op-amp 62 and pull-up resistor 69, which is coupled between the gate of n-channel transistor 68 and $V_{cc}$. The source of n-channel transistor 68 is coupled to ground and the drain of n-channel transistor 68 is coupled to the gate of p-channel transistor 70. The gate of p-channel transistor 70 is also coupled to the source of p-channel transistor 70 through resistor 72 and is further coupled to logic 58. The signal at the gate of p-channel transistor 70 is shown as the PWREN# signal.

The source of p-channel transistor 70 is also coupled to the power source ($V_{cc}$) 28. The drain of p-channel transistor 70 is coupled to the first terminal of a thermal protected resistor (TPR) 74. The second terminal of TPR 74 is coupled to Pin B. The output of op-amp 60 is coupled to the gate of p-channel transistor 86 through capacitor 88 (2.2 µF). The gate of p-channel transistor 86 is also coupled to the source of transistor 86 through resistor 90 (2.2 MΩ). The source of p-channel transistor 86 is also coupled to $V_{cc}$. Resistor 76 has a first terminal coupled to the drain of p-channel transistor 86 and a second terminal coupled to Pin B. Pin B is also connected to the non-inverting input of op-amp 62.

The operation of the circuit of FIG. 5 will also be discussed in connection with three possible states: (1) no external device 29 is coupled to the parallel port connector 48, (2) a floppy drive is coupled to the parallel port connector 48 and (3) a printer is coupled to the parallel port connector 48.

In the first case, where no external device is coupled to the parallel port connector 48, both Pin A will be pulled to $V_{cc}$ through pull-up resistor 61. Since the non-inverting input of op-amp 60 will be at $V_{cc}$, and hence higher than the voltage at the inverting input of op-amp 60, which is connected to Vref, the output of op-amp 60 will be open drain and the gate of n-channel transistor 82 will be pulled to $V_{cc}$. Transistor 82 will be enabled and pull the gate of transistor 68 to ground, which will turn off transistor 68. Similarly, p-channel transistor 70 will be turned off since its gate is pulled to $V_{cc}$ through resistor 72. P-channel transistor 86 will also be turned off.

Accordingly, no appreciable current will pass through either p-channel transistor 70 or p-channel transistor 86. It should also be noted that even if p-channel transistor 86 were enabled in this situation, no device is coupled to Pin B at this point, and therefor no current would be able to pass through p-channel transistor 86.

In the second situation, where a floppy drive is connected to the parallel printer connector 48, Pin A will be coupled to ground, thereby producing a zero volt output from op-amp 60, since the non-inverting input will be at a lower voltage than the inverting input. Consequently, n-channel transistor 82 will be turned off. Because capacitor 88 is coupled between the gate of transistor 86 (which will be at $V_{cc}$) and the output of op-amp 60 (which is at zero volts), it will be charged over time to a potential of $V_{cc}$ across its terminals. The speed of charging can be adjusted by the values of the resistor 90 and capacitor 88.

While the capacitor 88 is charging, the gate of p-channel transistor 86 will transition from ground to $V_{cc}$. Accordingly, p-channel transistor 86 will be initially enabled when the floppy drive is connected to the parallel port connector 48 and will be turned off once the gate reaches a voltage within a voltage threshold of the transistor 86. While p-channel transistor 86 is turned on, current will pass through resistor 76 to Pin B, which will charge Pin B to a voltage higher than Vref, placing the output of op-amp 62 in open drain mode. The gate of n-channel transistor 68 will be pulled to $V_{cc}$, thereby enabling transistor 68. Transistor 68 pulls the gate of p-channel transistor 70 to ground, allowing current to pass through p-channel transistor 70 to Pin B. Thus, the floppy drive may be powered through p-channel transistor 70.

After capacitor 88 is charged , p-channel transistor 86 will turn off. So long as p-channel transistor 86 turns off after p-channel transistor 70 turns on, p-channel transistor 70 will continue to pass current from the power source to Pin B, since the power source itself is keeping Pin B charged above $V_{cc}$.

If a printer is couple d to the parallel port connector 48, both Pin A and Pin B will be pulled to ground. As with the case of the floppy drive, a grounded Pin A will cause transistor 82 to turn off and capacitor 88 to charge. As capacitor 88 charges, p-channel transistor 86 will be enabled; however, it will not be able to charge Pin B to a voltage above Vref, since Pin B is grounded. Accordingly, the output of op-amp 62 will remain at zero volts, keeping n-channel transistor 68 and p-channel transistor 70 turned off. When p-channel transistor 86 turns off after capacitor 88 is charged to a predetermined potential, current will be stopped through p-channel transistor 86. Therefore, there will be no more current passing to Pin B.

Accordingly, upon connection to a device, such as a floppy drive or a printer, the circuit of FIG. 5 uses a timing circuit to pass current to Pin B. If the device is a floppy drive with Pin B configured appropriately, the current will charge Pin B to a voltage in excess of Vref, causing p-channel transistor 70 to turn on and power the device. If the device is a printer, and therefore Pin B is grounded, the timing circuit will turn off after a predetermined amount o f time, for example 10 seconds, and no more current will passed to the device. The charging time can be determined by the equation T=1.61*R*C, where R is the value of resistor 90 in ohms and C is the value of capacitor 88 is farads.

Although the Detailed Description of the invention has been directed to certain exemplary embodiments, various modifications of these embodiments, as well as alternative embodiments, will be suggested to those skilled in the art. For example, the n-channel transistors could be replaced with NPN transistors, JFET (junction field effect) transistors or BJT (bipolar junction) transistors. The p-channel transistors and associated resistors could BE replaced using hybrid MOSFET transistors (such as the TPS 20120 from TEXAS INSTRUMENTS INCORPORATED) or PNP transistors. The timing circuitry including capacitor 88, p-channel transistor 86 and resistor 90 could be replaced with a number of timing circuits, such as a relay with a low impedance coil, a photo switch with low enable. The invention encompasses any modifications or alternative embodiments that fall within the scope of the Claims.

What is claimed is:

1. A computer system comprising:

processing circuitry;

an input/output port connector coupled to said processing circuitry comprising a plurality of input/output pins for transmitting signals;

data drive detection circuitry for detecting a connection of a data drive to said input/output port connector; and power enable circuitry, responsive to said detection circuitry, for selectively applying power to one of said pins to power a detected data drive.

2. The computer of claim 1 wherein said data drive detection circuitry comprises:

circuitry for detecting a predetermined signal on a first pin;

circuitry for providing current to a second pin responsive to detecting said predetermined signal on said first pin; and circuitry for generating a predetermined output responsive to the voltage on said second pin.

3. The computer of claim 1 wherein said predetermined signal is a ground voltage signal.

4. The computer of claim 1 wherein said second pin is connected to ground if a printer is connected to said input/output port and to a load if said input/output port is coupled to a data drive.

5. The computer of claim 1 wherein said input/output port connector is a parallel port connector.

6. The computer of claim 2 wherein said data drive detection circuitry further comprises circuitry for disabling current to said second pin.

7. The computer of claim 6 wherein said circuit for disabling current comprises circuitry for disabling current to said second pin after a predetermined time.

8. The computer of claim 1 and further comprising thermal protection circuitry for disabling power to said data drive responsive to overheating.

9. A computer comprising:

processing circuitry;

an parallel port connector coupled to said processing circuitry comprising a plurality of input/output pins for transmitting signals to a connected one of either a data drive or a printer;

data drive detection circuitry for detecting whether the data drive or the printer is connected to said parallel port connector; and power enable circuitry, responsive to said detection circuitry, for selectively applying power to one of said pins to power a detected data drive and disabling power to a detected printer.

10. The computer of claim 9 wherein said data drive detection circuitry comprises a first operational amplifier coupled to said first pin and a reference voltage and a second operational amplifier coupled to a second pin and said reference voltage, the output of said first operational amplifier responsive to whether said first pin is coupled to a predetermined voltage and the output of said second operational amplifier responsive to whether said second pin is coupled to a voltage rail.

11. The computer of claim 10 wherein said data drive detection circuitry further comprises circuitry for providing current to said second pin.

12. The computer of claim 11 wherein said circuitry for providing current to said second pin comprises circuitry for providing current to said second pin for a predetermined time duration.

13. The computer of claim 9 wherein said power switching circuitry comprises a transistor.

14. The computer of claim 9 and further comprising logic generating a signal indicating whether a data drive is coupled to said parallel port connector responsive to the output of said data drive detection circuitry.

15. Circuitry for selectively applying power to a device coupled to an input/output port connector having a plurality of pins, comprising:

device detection circuitry for detecting a connection of said device to said input/output port connector;

device identification circuitry for determining whether said device has a power rail coupled to a first pin of said input/output connector; and power enable circuitry, responsive to said detection circuitry, for selectively applying power to said first pin to power the device responsive to said device identification circuitry.

16. The power applying circuitry of claim 15 wherein said device detection circuitry comprises circuitry responsive to a ground signal on a second pin.

17. The power applying circuitry of claim 15 wherein said device identification circuitry comprises circuitry for generating a identification signal responsive to whether said first pin is coupled to a power rail.

18. The power applying circuitry of claim 17 wherein said circuitry for generating an identification signal comprises circuitry for applying a current to said first pin.

19. The power applying circuitry of claim 17 wherein said circuitry for generating an identification signal comprises circuitry for applying a current to said first pin for a predetermined duration of time.

20. The power applying circuitry of claim 15 wherein said power switching circuitry comprises circuitry for passing current to said first pin responsive to said identification signal.

21. The power applying circuitry of claim 18 wherein said power switching circuitry comprises a transistor having a control gate driven by said identification signal.

22. A method of selectively applying power to a device coupled to an input/output port connector having a plurality of pins, comprising the steps of:

detecting a connection of the device to the input/output port connector;

determining whether the device has a power rail coupled to a first pin of said input/output connector; and coupling a voltage source to said first pin to power the device responsive to said determining step.

23. The method of claim 22 wherein said detecting step comprises the step of detecting whether a second pin is connected to ground.

24. The method of claim 22 wherein said determining step comprises the step of generating an identification signal responsive to whether said first pin is coupled to a power rail.

25. The method of claim 24 wherein said generating step comprises the step of applying current to said first pin.

26. The method of claim 24 wherein said generating step comprises the step of applying current to said first pin for a predetermined duration of time.

27. The method of claim 22 wherein said coupling step comprises the step of coupling the voltage source to said first pin responsive to said identification signal.

28. A computer system comprising:

processing circuitry;

an input/output port connector coupled to said processing circuitry comprising a plurality of input/output pins for transmitting signals; and power switching circuitry for detecting a connection of a data drive to said input/output port connector and circuitry, responsive to detecting a connection of a data drive to said input/output port connector, for selectively applying power to one of said pins to power a detected data drive.

29. The computer of claim 28 wherein said power switching circuitry comprises:

detection circuitry for detecting a connection of a data drive to said input/output port connector; and power enable circuitry, responsive to said detection circuitry, for selectively applying power to one of said pins to power a detected data drive.

30. The computer of claim 29 further comprising logic circuitry coupled to said detection circuitry and said power enable circuitry for generating an SMI (system management interrupt) whenever a data drive is connected or disconnected to said input/output port connector.

31. A computer system comprising:

processing circuitry;

an input/output port connector coupled to said processing circuitry comprising a plurality of input/output pins for transmitting signals; and power switching circuitry for detecting a connection of an external device to said input/output port connector and circuitry, said power switching circuitry coupling one of said input/output pins to Vcc and another of said input/output pins to ground when said external device is of a selected type and coupling said one and another of said input/output pins to ground when said external device is not of a selected type.

32. The computer of claim 31 wherein said power switching circuitry floats said one and another of said input/output pins when no external device is detected.

* * * * *